United States Patent [19]
Liu et al.

[11] Patent Number: 5,948,875
[45] Date of Patent: Sep. 7, 1999

[54] POLYURETHANEUREAS AND SPANDEX MADE THEREFROM

[75] Inventors: Hong Liu; Robert Otto Waldbauer, Jr., both of Waynesboro, Va.

[73] Assignee: E. I. du Pont de Nemours and Company, Wilmington, Del.

[21] Appl. No.: 09/048,808

[22] Filed: Mar. 26, 1998

[51] Int. Cl.$^6$ ..................................... C08G 18/32
[52] U.S. Cl. ............................... 528/61; 528/76; 528/906

[56] References Cited

U.S. PATENT DOCUMENTS 4,973,647  11/1990  Bretches et al. .......................... 528/61
5,000,899   3/1991  Dreibelbis et al. ..................... 264/205

FOREIGN PATENT DOCUMENTS

H 9-136937  11/1995  Japan .............................. C08G 18/48

Primary Examiner—Rachel Gorr
Attorney, Agent, or Firm—George A. Frank

[57] ABSTRACT

New polyurethaneurea polymers and spandex made therefrom, based on certain glycols, MDI and a diamine chain extender mixture containing high proportions of 2-methyl-1,5-pentanediamine and prepared at selected capping ratios, are provided.

10 Claims, No Drawings

POLYURETHANEUREAS AND SPANDEX MADE THEREFROM

FIELD OF THE INVENTION

This invention relates to new polyurethaneureas and spandex made therefrom having good heat-set efficiency and, more particularly, it relates to spandex based on selected polyether glycols, made with a high capping ratio and a high proportion of 2-methyl-1,5-pentanediamine as a chain extender.

DISCUSSION OF BACKGROUND ART

U.S. Pat. No. 4,973,647, to Bretches et al., discloses the use of a 28–32 mole percent 2-methyl-1,5-diaminopentane (MPMD) component in a diamine chain extender mixture (with ethylene diamine) for preparing spandex based on poly(tetramethyleneether) glycol. However, when the MPMD content exceeds 32 mole % or falls below 28 mole %, respectively, physical properties such as break elongation and heat settability suffer and become unacceptable.

U.S. Pat. No. 5,000,899, to Dreibelbis et al., discloses a spandex made from a copolyether glycol of 3-methyltetrahydrofuran and tetrahydrofuran, an organic diisocyanate and a mixture of diamines, the mixture containing, e.g., ethylene diamine and a diamine coextender, e.g., 2-methyl-1,5-pentanediamine, the latter amounting to 20–50 mole percent of the total diamine mixture. However, this spandex must be heat-set at high temperatures generally utilized with commercial yarns containing 6-nylon fibers.

Japanese Published Patent Application 09-136937 discloses spandex based on copolyether glycols, organic diisocyanates, and mixtures of nonbranched linear aliphatic diamines with branched chain aliphatic diamines, the latter preferably less than 20 mole % of the total. When a 65/35 mole % mixture of ethylenediamine and 2-methyl-1,5-pentanediamine was used, there were found substantial high temperature set and problems in practical use.

There is still a need for spandex having a desirable balance of properties, that is, a spandex which can be heat-set efficiently at moderate temperatures and, simultaneously, provide a desirable balance of other physical properties such as low load power and high elongation.

SUMMARY OF THE INVENTION

The composition of the present invention is a polyurethaneurea polymer based on:

a polyether glycol selected from the group consisting of a homopolymer of tetrahydrofuran (THF) and a copolymer of tetrahydrofuran and 3-methyltetrahydrofuran (3-MeTHF);

1,1'-methylenebis(4-isocyanatobenzene); and a diamine chain extender(s) wherein at least one diamine is 2-methyl-1,5-pentanediamine (MPMD) present to an extent of at least 50 mole % of the mixture of diamines when the glycol is said homopolymer and at least 55 mole % when the glycol is said copolymer; and wherein the range of ratios of said bisisocyanate to said glycol depends on the amount of MPMD present in said mixture of diamines and on the type of glycol and is determined as follows,

|  | % MPMD | capping ratio |
|---|---|---|
| homopolymer of THF | 50 | 1.81–2.07 |
|  | 60 | 1.87–2.15 |
|  | 70 | 1.93–2.23 |
|  | 80 | 1.99–2.31 |
|  | 90 | 2.05–2.39 |
|  | 100 | 2.10–2.50 |
| copolymer of THF and 3-MeTHF | 55 | 2.28–2.67 |
|  | 60 | 2.33–2.74 |
|  | 70 | 2.43–2.88 |
|  | 80 | 2.54–3.01 |
|  | 90 | 2.65–3.15 |
|  | 100 | 2.76–3.30 |

DETAILED DESCRIPTION OF THE INVENTION

As used herein, "spandex" means a manufactured fiber in which the fiber-forming substance is a long chain synthetic elastomer comprised of at least 85% by weight of a segmented polyurethane. Spandex is prepared by first reacting a polymeric glycol (for example a polyether glycol) with a diisocyanate to form an NCO-terminated prepolymer (a "capped glycol"), dissolving the capped glycol in a suitable solvent such as dimethylacetamide ("DMAc"), dimethylformamide, or N-methylpyrrolidone and then reacting with a difunctional chain extender (and optionally a minor amount of monofunctional chain terminator such as diethylamine, DEA, to limit the polymer molecular weight) to form a polyurethane. The solution of polyurethane is then dry-spun or wet-spun to form the spandex.

Fabrics or yarns which contain spandex in combination with non-elastomeric fibers are typically heat-set to provide the fabric or yarn with good dimensional stability, to shape the finished garment, and for other textile purposes. Typical heat-setting temperatures used in commercial operations are 195° C. for 6,6-nylon, 190° C. for 6-nylon, and 180° C. for cotton. The relatively low temperatures suitable for fibers such as cotton put certain demands on the spandex. For example, if the spandex has an acceptable heat-set efficiency only at temperatures used for the nylons, it cannot be heat-set in a fabric containing cotton, which will be damaged by exposure to such higher temperatures.

It was now found surprisingly that a spandex made from a polyether glycol, a diisocyanate, and high proportions of 2-methyl-1,5-pentanediamine chain extender (also referred to as methylpentamethylenediamine, MPMD), can have a highly desirable combination of high heat-set efficiency at moderate temperatures, optimum load power and high elongation. The minimum MPMD content in the diamine chain extender mixture is 50 mole % when the polyether glycol is a homopolymer of THF, poly(tetramethyleneether) glycol, and 55 mole % when the polyether glycol is a copolymer THF and 3-MeTHF.

The desirable combination of properties provided by high levels of MPMD can be obtained when a high capping ratio (ratio of diisocyanate to glycol) of 1,1-methylenebis(4-isocyanatobenzene) ("MDI") to polyether glycol is used. The capping ratios that need to be utilized depend on the type of polyether glycol used and the amount of MPMD present in the diamine chain extender mixture. For example, when the glycol is a homopolymer of THF (for example, having a number average molecular weight in the range of about 1600 to 2200), and MPMD is present to an extent of at least about 50 mole percent of total chain extender (any remaining chain extender being, for example, ethylenediamine, EDA), the capping ratio is in the range of 1.81–2.50, depending on the amount of MPMD present. The higher the proportion of MPMD, the higher the capping ratio needs to be in order to obtain the most desirable balance of properties provided by the spandex of this invention. The capping ratio ranges for poly(tetramethyleneether) glycol, are determined from the tabulation below:

| mole % MPMD | capping ratio range |
|---|---|
| 50 | 1.81–2.07 |
| 60 | 1.87–2.15 |
| 70 | 1.93–2.23 |
| 80 | 1.99–2.31 |
| 90 | 2.05–2.39 |
| 100 | 2.10–2.50 |

For MPMD levels between those specifically shown above, capping ratios can be readily interpolated.

When the capping ratio is below those shown in the above tabulation, the load power becomes excessively low. At capping ratios greater than those shown above, the elongation-to-break and heat-set efficiency become low, and the load power and percent set become unacceptably high.

A spandex with good properties can also be obtained when the polyether glycol is a copolyether glycol of THF and 3-MeTHF. This polymer generally contains about 4–20 mole percent 3-MeTHF. A useful number average molecular weight for such a copolyether glycol is in the range of 3000–4000. As stated above, the amount of MPMD with such copolymers must be at least about 55 mole % of the diamine chain extender mixture. The remainder is preferably EDA. The capping ratio is in the range of about 2.28–3.30 depending on the amount of MPMD present and is determined from the tabulation below:

| mole % MPMD | capping ratio range |
|---|---|
| 55 | 2.28–2.67 |
| 60 | 2.33–2.74 |
| 70 | 2.43–2.88 |
| 80 | 2.54–3.01 |
| 90 | 2.65–3.15 |
| 100 | 2.76–3.30 |

For MPMD levels between those specifically shown above, capping ratios can be readily interpolated.

Spandex based on such copolyether glycols is preferred for use in the present invention. With such glycols, it is preferred that the chain extender be at least 80 mole % MPMD with the remainder being EDA. An especially preferred spandex is prepared from a copolyether glycol with a THF:3-MeTHF molar ratio of 90-85:10-15 mole %, MDI, a capping ratio in the range of about 2.76–3.30, and MPMD as substantially the only chain extender.

In addition to MPMD in the chain extender diamine mixtures, one can utilize diamines such as ethylenediamine (EDA), 1,3-propylenediamine and 1,4-cyclohexylenediamine with EDA being preferred.

The following test methods were used:

The NCO content of the capped glycols was determined according to the method of S. Siggia, "Quantitative Organic Analysis via Functional Group", 3rd Edition, Wiley & Sons, New York, pages 559–561 (1963).

The strength and elastic properties of the spandex and films were measured in accordance with the general method of ASTM D 2731-72. Three filaments, a 2-inch (5-cm) gauge length and a 0–300% elongation cycle were used for each of the measurements. The samples were cycled five times at a constant elongation rate of 50 centimeters per minute. Load power, the stress on the spandex during initial extension, was measured on the first cycle at 200% extension and is reported as deciNewtons/tex. Unload power is the stress at an extension of 200% for the fifth unload cycle and is also reported in deciNewtons/tex. Percent elongation at break and tenacity were measured on a sixth extension cycle. Percent set was also measured on samples that had been subjected to five 0–300% elongation/relaxation cycles. The percent set, %S, was then calculated as $$\%S = 100(Lf-Lo)/Lo,$$

where Lo and Lf are respectively the filament (yarn) length when held straight without tension before and after the five elongation/relaxation cycles.

To measure heat-set efficiency, the spandex and film samples were mounted on a 10-cm frame and stretched 1.5× (50%). The frame (with sample) was placed horizontally in an oven preheated to 170° C., 180° C., or 190° C. for 120 seconds. The samples were allowed to relax and the frame to cool to room temperature. The samples, still on the frame, were immersed in boiling water for 30 min. The frame and samples were removed from the bath and allowed to dry. The length of the yarn samples was measured and heat-set efficiency, HSE, was calculated from the following equation:

$$\% \, HSE = 100 \times \frac{\text{heat-set length} - \text{original length}}{\text{stretched length} - \text{original length}}$$

Each sample was tested four times, and the results were averaged.

To determine steam set, which simulates hosiery processing and boarding operations, a sample of a chosen length in the straight non-tensioned condition, Yo, (conveniently 10 cm) was stretched to three times its original length for about 2 minutes and then relaxed. This simulated a covering operation in which the spandex was drafted while being covered with a conventional yarn. The thusly stretched and relaxed spandex test sample was then placed in a boiling water bath for 30 minutes. This exposure to boiling water simulated a dyeing operation. The sample was then removed from the bath, dried, and stretched to twice its post-bath relaxed length. While in this stretched condition, the sample was exposed for 30 seconds to an atmosphere of steam at 10 psig (69 KPa), 110° C. This steam treatment simulates hosiery boarding. After removal from the steam atmosphere, the sample was allowed to dry, and its straight non-tensioned length, Yf, was measured. Steam set (SS,%) was then calculated according to the formula, $$\%SS = 100(Yf-Yo)/Yo.$$

EXAMPLES

In the Examples, samples designated with Arabic numerals are samples of the invention, and those designated with upper case letters are comparison samples. In the Tables, Tb is tenacity at break, Eb is elongation to break, LP is load power, measured on the first stretch-and-recovery cycle at 200% elongation, UP is unload power, measured on the fifth stretch-and-recovery cycle at 200% elongation, HSE is heat-set efficiency, and SS is steam set. Although the diisocyanate is exemplified as having been added all at once, it can also be added in two steps. For example, 1800 molecular weight poly(tetramethyleneether) glycol can be capped first with MDI to 1.63 capping ratio (2.4% NCO), and then more MDI can be added to achieve higher capping ratios.

Example 1

Into a 2000-ml dried flask was added 200.00 grams of copolyether glycol (3-MeTHF/THF mole ratio 14/86, number average molecular weight 3500) in a nitrogen filled drybox. The flask was equipped with an air-motor driven agitator, a thermocouple and a heating mantle. The glycol was preheated to 85° C., then a 43.29-gram quantity of molten MDI (45–50° C.) was added. The capping reaction temperature was maintained at 90° C. for 90 min with continuous stirring. Upon completion of the capping reaction, as determined by titration of the capped glycol, reaching the desired %NCO of 4.00+/−0.05 (corresponding to a capping ratio of about 3.03), 313.90 grams of purified DMAc was added with vigorous agitation. When dissolution was complete, a mixture of chain extender solution (235.45 grams of 1.0 meq/g MPMD in DMAC) and chain terminator solution (9.63 gram of 1.2 meq/g DEA in DMAc) was added quickly. The viscosity of the mixture rose almost instantaneously, and the mixture then was stirred slowly for one hour after chain extension. This polymer solution (32% solids) was stored in a Nalgene plastic bottle at room temperature overnight. Five filaments were dry-spun from the solution and coalesced by conventional methods into a 44 dtex threadline wound up at a speed of 275 meters per minute.

The properties of the resulting spandex are shown as Sample 2 in Table I. The other fibers in Table I were similarly prepared as above, except that the capping ratio (C.R.) was varied as indicated.

TABLE I

| SAMPLE | C.R. | Tb dN/tex | Eb, % | LP dN/tex | UP dN/tex | SET % | HSE % 170° C. | HSE % 180° | SS % |
|---|---|---|---|---|---|---|---|---|---|
| A | 2.58 | 0.61 | 689 | 0.037 | 0.019 | 41 | 82 | nm | 50 |
| 1 | 2.80 | 0.85 | 717 | 0.046 | 0.021 | 41 | 84 | 94 | 54 |
| 2 | 3.03 | 0.94 | 668 | 0.060 | 0.021 | 41 | 72 | 94 | 60 |
| 3 | 3.26 | 1.16 | 647 | 0.075 | 0.021 | 40 | 68 | 89 | nm |
| B | 3.50 | 0.95 | 623 | 0.088 | 0.021 | 46 | 68 | 89 | 73 |

As can be seen from these data, the spandex of the present invention has high heat-set efficiency even at moderate temperatures, while maintaining a good balance of other physical properties, such as elongation and load power when contrasted with spandex outside of this invention (capping ratios outside of the range 2.76–3.30).

Example 2

A polyurethaneurea polymer was prepared substantially as in Example 1, but utilizing a homopolyether glycol. To 200.00 g of 1800 molecular weight poly(tetramethyleneether) glycol (Terathane* 1800, a registered trademark of E. I. du Pont de Nemours and Company) was added 52.64 g MDI (%NCO 3.30, corresponding to a capping ratio of about 1.89), and the mixture was stirred at 90° C. for 120 minutes. 352.02 g DMAC was added, followed by 202.33 g of a solution of EDA/MPMD (50/50 mole %) diamine chain extender mixture (1.0 meq/g) and 9.80 g solution of DEA terminator (1.2 meq/g). The resulting polymer solution had 32% solids content. Four filaments were dry-spun from the solution at 275 meters per minute and coalesced into a single 44 dtex spandex threadline. The properties of the spandex are shown as Sample 4 in Table II. The other fibers in Table II were similarly prepared but varying the proportions of MPMD in the diamine mixture and varying the capping ratios.

TABLE II

| SAMPLE | MPMD % | C.R. | Tb dN/tex | Eb, % | LP dN/tex | UP dN/tex | SET % | HSE % 190° C. |
|---|---|---|---|---|---|---|---|---|
| C | 30 | 1.76 | 0.61 | 547 | 0.069 | 0.019 | 29 | 92 |
| D | 40 | 1.83 | 0.75 | 562 | 0.072 | 0.019 | 28 | 91 |
| 4 | 50 | 1.89 | 1.25 | 557 | 0.080 | 0.021 | 27 | 95 |
| 5 | 60 | 1.96 | 0.92 | 561 | 0.065 | 0.017 | 26 | 98 |
| 6 | 70 | 2.03 | 0.91 | 549 | 0.058 | 0.016 | 25 | 98 |
| 7 | 80 | 2.09 | 0.65 | 532 | 0.049 | 0.014 | 33 | broke |
| 8 | 90 | 2.16 | 0.91 | 645 | 0.040 | 0.012 | 52 | broke |
| 9 | 100 | 2.23 | 0.62 | 605 | 0.039 | 0.011 | 64 | broke |

The same conclusions can be drawn from these data for a homopolyether glycol-based spandex as in Example 1. Sample fibers 7, 8 and 9 broke during heat-setting because the test temperature was unusually high.

Example 3

A polyurethaneurea polymer was prepared substantially as in Example 2, except only MPMD was used as the chain extender. To 200.00 g of Terathane* 1800 was added 62.17 g of MDI (%NCO 4.40, corresponding to a capping ratio of about 2.23) and the mixture was stirred at 90° C. for 90 minutes. 317.75 g DMAC was added, followed by 278.70 g MPMD solution (1.0 meq/g) and 10.43 g DEA solution (1.2 meq/g). The resulting polymer solution had 32% solids content. Five filaments were dry-spun from the solution and coalesced by conventional methods into a 44 dtex threadline wound up at a speed of 275 meters per minute. The properties of the spandex are shown as Sample 11 in Table III. The other fibers in Table III were similarly prepared at various capping ratios.

TABLE III

| SAMPLE | C.R. | Tb dN/tex | Eb, % | LP dN/tex | UP dN/tex | SET % | HSE, % 170° C. | HSE, % 180° C. |
|---|---|---|---|---|---|---|---|---|
| E | 1.98 | 0.68 | 568 | 9.036 | 0.016 | 45 | 90 | — |
| 10 | 2.11 | 0.62 | 539 | 0.047 | 0.019 | 44 | 89 | 106 |
| 11 | 2.23 | 0.90 | 563 | 0.048 | 0.017 | 42 | 87 | 99 |
| 12 | 2.37 | 0.78 | 529 | 0.061 | 0.017 | 46 | 86 | 93 |
| 13 | 2.50 | 0.85 | 533 | 0.070 | 0.017 | 49 | 84 | 101 |

These results also demonstrate that spandex with an unexpectedly good balance of properties can be obtained with a homopolyether glycol and 100 mole % MPMD when the capping ratio is in the range of 2.10–2.50.

Example 4

Polyurethaneurea polymers were prepared substantially as in Example 1, but utilizing varying capping ratios and EDA/MPMD ratios. The polymer solutions were cast into films by pouring each solution onto a Mylar® polyester film and drawing the solution into strips using a 0.015-mil doctor knife. The solvent was removed in a drying box swept with dry nitrogen in approximately 16 hours. The tops of the films were dusted with talcum powder and the film/polyester film composites were cut into 0.32 cm (0.125 inch) by 12.7 cm (5 inch) strips with a multiple bladed razor knife. Talcum powder was applied to the back of the film as it was lifted from the polyester surface. The results of stress-strain and heat-set efficiency are reported in Table IV.

TABLE IV

| SAMPLE | MPMD % | C.R. | Tb dN/tex | Eb, % | LP dN/tex | UP dN/tex | SET % | HSE, % 190° C. |
|---|---|---|---|---|---|---|---|---|
| F | 50 | 2.30 | 0.38 | 667 | 0.045 | 0.021 | 18 | 71 |
| G | 100 | 2.30 | 0.38 | 669 | 0.031 | 0.018 | 32 | 90 |
| 14 | 100 | 3.03 | 0.41 | 578 | 0.041 | 0.019 | 28 | 81 |
| 15 | 80 | 2.80 | 0.46 | 623 | 0.039 | 0.020 | 22 | 85 |

Again, as can be seen from the data in Table IV, the proper balance of physical properties and heat set efficiencies can only be obtained from the polymers of this invention and routine trial-and-error manipulation of capping ratios and MPMD content does not lead to acceptable results. Only when the parameters of this invention are adhered to does one get acceptable spandex properties.

We claim:

1. A polyurethaneurea polymer consisting essentially of the product of:

a polyether glycol selected from the group consisting of a homopolymer of tetrahydrofuran and a copolymer of tetrahydrofuran and 3-methyltetrahydrofuran monomers;

1,1'-methylenebis(4-isocyanatobenzene); and a diamine chain extender(s) wherein at least one diamine is 2-methyl-1,5-pentanediamine present to an extent of at least 50 mole % of the mixture of diamines when the glycol is said homopolymer and at least 55 mole % when the glycol is said copolymer;

wherein the range of ratios of said bis-isocyanate to said glycol is

|  | % MPMD | capping ratio |
|---|---|---|
| for said homopolymer, | 50 | 1.81–2.07 |
|  | 60 | 1.87–2.15 |
|  | 70 | 1.93–2.23 |
|  | 80 | 1.99–2.31 |
|  | 90 | 2.05–2.39 |
|  | 100 | 2.10–2.50 and |
| for said copolymer, | 55 | 2.28–2.67 |
|  | 60 | 2.33–2.74 |
|  | 70 | 2.43–2.88 |
|  | 80 | 2.54–3.01 |
|  | 90 | 2.65–3.15 |
|  | 100 | 2.76–3.30. |

2. The polyurethaneurea polymer of claim 1 wherein said copolymer contains 4–20 mole % of 3-methyltetrahydrofuran monomer.

3. The polyurethaneurea polymer of claim 2 said copolymer has a number average molecular weight in the range of 3000–4000.

4. The polyurethaneurea polymer of claim 3 wherein 2-methyl-1,5-pentanediamine is present to the extent of at least 80 mole % of total chain extender, the remaining chain extender being ethylenediamine.

5. The polyurethaneurea polymer of claim 2 wherein the 3-methyltetrahydrofuran monomer is present in said copolymer to the extent of 10–15 mole % and the chain extender is 2-methyl-1,5-pentanediamine.

6. The polyurethaneurea polymer of claim 1 wherein said polyether glycol is a homopolymer of tetrahydrofuran.

7. The polyurethaneurea polymer of claim 6 wherein said homopolymer has a number average molecular weight in the range of 1600–2200.

8. The polyurethaneurea polymer of claim 7 wherein 2-methyl-1,5-pentanediamine is present to the extent of at least 80 mole % of total chain extender, the remaining chain extender being ethylenediamine.

9. The polyurethaneurea polymer of claim 6 wherein the chain extender is 2-methyl-1,5-pentanediamine.

10. A spandex spun from a polyurethaneurea polymer consisting essentially of the product of:

a polyether glycol selected from the group consisting of a homopolymer of tetrahydrofuran and a copolymer of tetrahydrofuran and 3-methyltetrahydrofuran monomers;

1,1'-methylenebis(4-isocyanatobenzene); and a diamine chain extender(s) wherein at least one diamine is 2-methyl-1,5-pentanediamine present to an extent of at least 50 mole % of the mixture of diamines when the glycol is said homopolymer and at least 55 mole % when the glycol is said copolymer; and wherein the range of ratios of said bis-isocyanate to said glycol is

|  | % MPMD | capping ratio |
|---|---|---|
| for said homopolymer, | 50 | 1.81–2.07 |
|  | 60 | 1.87–2.15 |
|  | 70 | 1.93–2.23 |
|  | 80 | 1.99–2.31 |
|  | 90 | 2.05–2.39 |
|  | 100 | 2.10–2.50 and |
| for said copolymer, | 55 | 2.28–2.67 |
|  | 60 | 2.33–2.74 |
|  | 70 | 2.43–2.88 |
|  | 80 | 2.54–3.01 |
|  | 90 | 2.65–3.15 |
|  | 100 | 2.76–3.30. |

* * * * *

UNITED STATES PATENT AND TRADEMARK OFFICE
CERTIFICATE OF CORRECTION

PATENT NO. : 5,948,875
DATED : September 7, 1999
INVENTOR(S) : Hong Liu and Robert Otto Waldbauer, Jr.

It is certified that error appears in the above-indentified patent and that said Letters Patent is hereby corrected as shown below:

Table III, line 1 under the heading "LP", please change the number "9.036" to -- 0.036 --.

Signed and Sealed this

Twenty-fifth Day of April, 2000

Attest:

Q. TODD DICKINSON

*Attesting Officer*  Director of Patents and Trademarks